Jan. 18, 1949.   R. McDOWALL   2,459,234
FLAME SEALING APPARATUS
Filed Oct. 18, 1945   2 Sheets-Sheet 1

INVENTOR.
ROBERT McDOWALL
BY
Wm. S. Pritchard
ATTORNEY.

Jan. 18, 1949.　　　　　R. McDOWALL　　　　　2,459,234
FLAME SEALING APPARATUS
Filed Oct. 18, 1945　　　　　　　　　　　　　2 Sheets-Sheet 2
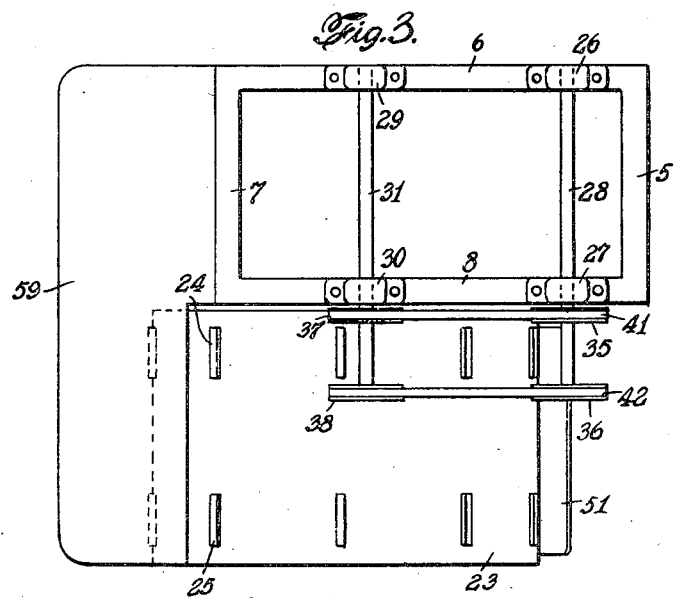
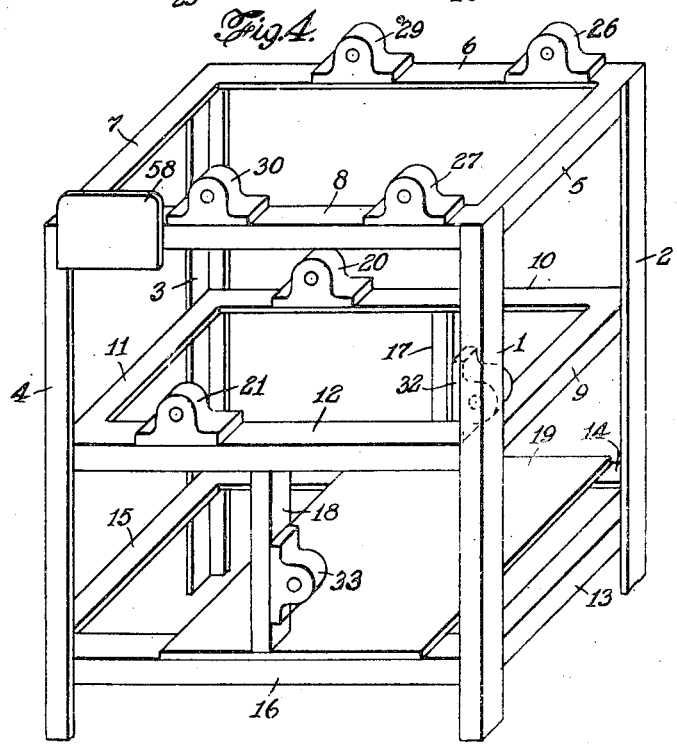
INVENTOR.
ROBERT McDOWALL
BY
ATTORNEY.

Patented Jan. 18, 1949

2,459,234

UNITED STATES PATENT OFFICE 2,459,234

FLAME SEALING APPARATUS

Robert McDowall, Chicago, Ill., assignor to The Visking Corporation, Chicago, Ill., a corporation of Virginia Application October 18, 1945, Serial No. 622,983

3 Claims. (Cl. 154—42)

This invention relates to an apparatus for flame sealing sheets of thermoplastic material in order to secure the edge of one sheet or layer of thermoplastic material to the edge of another. It relates more particularly to bonding sheets or layers of thermoplastic material of the order of thickness of from 0.00005" to 0.005", although it is within the scope of this invention to bond thicker sheets of material.

This invention is particularly adapted to bond and close the ends of thermoplastic tubes to form gas, moisture and waterproof bags or containers in which various articles may be packaged. The apparatus has been found satisfactory to close the ends of seamless tubes made from polyethylene, although it may be used to bond various other thermoplastic materials, such as, by way of example but not by way of limitation, polyisobutylene, Pliofilm, ethyl cellulose, cellulose acetate and copolymers of vinyl chloride and vinyl acetate.

It is well known that when thin sheets of plastic material are submitted to an open flame in an oxidizing atmosphere, such as air, the plastic has a tendency to char, and, in many instances, to decompose. It has been found that by the use of the apparatus of this invention the end of a thin seamless tube of plastic may be sealed without charring and without decomposition, leaving a gas, moisture and waterproof beaded seam that is even stronger than the material itself.

Referring to the drawings:

Figure 3 is a top view of the apparatus; and

Figure 4 is a perspective of the main frame of the apparatus.

Figure 1:
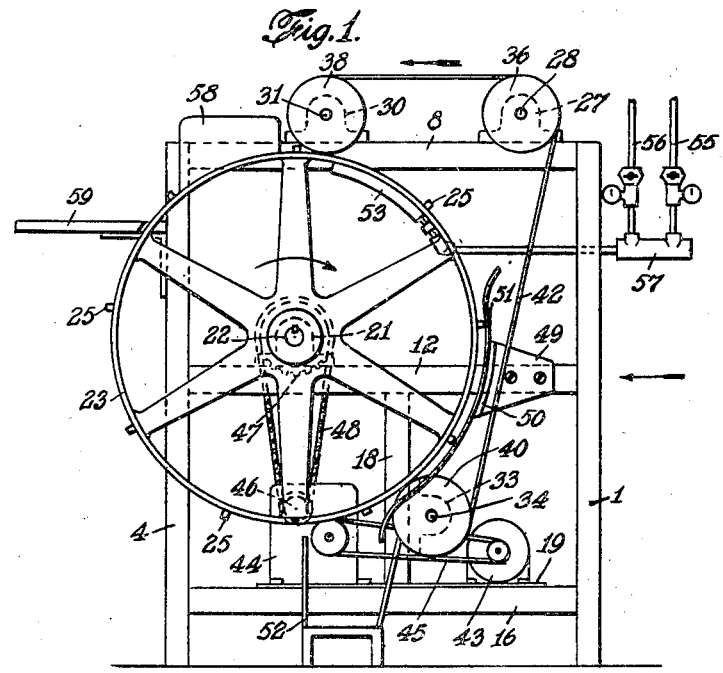
Figure 1 is a side elevation of the flame sealing apparatus.

Referring to Figure 4, the frame consists of uprights 1, 2, 3 and 4. These uprights are secured together by the horizontal pieces 5, 6, 7, 8, 9, 10, 11, 12, 13, 14, 15 and 16. To the horizontal pieces 10 and 14 is secured a vertical upright piece 17, and to the horizontal pieces 12 and 16 is secured a vertical upright piece 18. A shelf 19 is supported on the cross-pieces 14 and 16. The purpose of this shelf will afterwards appear.

Mounted on the cross-pieces 10 and 12 are pillow blocks 20 and 21. These pillow blocks are equipped with ball-bearings and form a bearing for a main shaft 22. A hollow metal cylinder or drum 23 is keyed to the shaft 22 so that the hollow drum 23, which may be made of steel or cast iron, rotates with the shaft 22. The drum 23 is provided with cleats or ledges 24 and 25, which form supports for the tubes to be acted on. These cleats also position the tubes circumferentially on the drum 23.

Mounted on the cross-pieces 6 and 8 are pillow blocks 26 and 27. These pillow blocks carry a shaft 28. Likewise, mounted on the cross-pieces 6 and 8 are pillow blocks 29 and 30, which carry a shaft 31. On the uprights 17 and 18 are mounted pillow blocks 32 and 33. These carry a shaft 34. The shaft 28 has mounted on one end two pulleys 35 and 36. Likewise, the shaft 31 has mounted on one end pulleys 37 and 38. The shaft 34 has mounted on one end pulleys 39 and 40. These pulleys 35, 36; 37, 38; and 39, 40 are all grooved to receive two endless steel bands 41 and 42. Thus, the band 41 passes over the pulleys 35, 37 and 39, while the band 42 passes over the pulleys 36, 38 and 40. The bands are adapted to bear against the periphery of the drum 23. The edge of the band or belt 41 nearest the frame of the machine coincides with the end of the drum 23 next to the frame.

Mounted on the shelf 19 is a motor 43 which drives a gear-reducing mechanism 44 mounted on the shelf 19 by means of a V-belt 45. The speed-reducing mechanism is equipped with a sprocket 46, and the shaft 22 is likewise equipped with a sprocket 47. A roller chain 48 is driven by the sprocket 46, which, in turn, drives the shaft 22 through the sprocket 47. Secured to the horizontal cross-piece 12 is a bracket 49 having a flange plate 50. This flange plate supports an arcuate shield 51. The shield 51 is so positioned relative to the drum 23 as to just avoid the cleats or ledges 24 and 25. The shield 51 tends to hold the end of the tubular article on to the drum when the tube to be sealed is longer than the distance between the two steel bands 41 and 42. The shield also tends to divert the sealed tubing into a container or receptacle 52.

Figure 2:
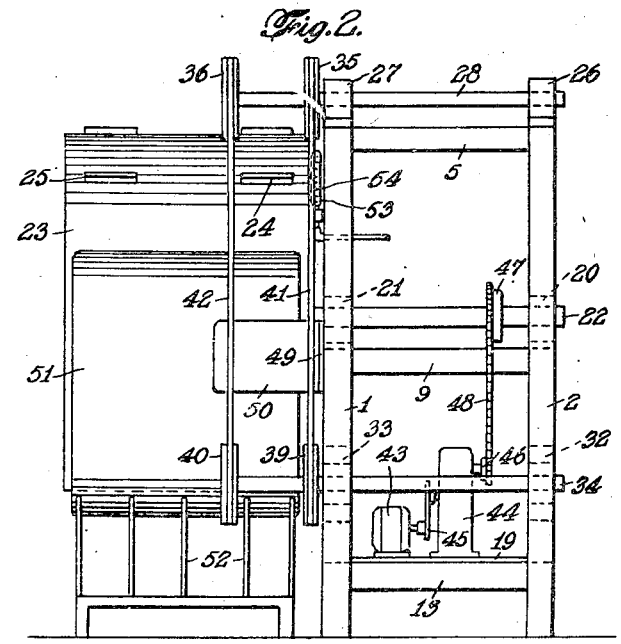
Figure 2 is an end view of the flame sealing apparatus taken in the direction of the arrow (Figure 1)

Mounted on the frame of the machine is a burner 53. This is an open flame gas burner arcuate in shape and having a plurality of openings, as shown in Figure 2, at 54. A supply of air 55 meets a supply of gas 56 in a mixing chamber 57.

Mounted on the cross-piece 8 is a guide plate or gauge 58. This guide plate or gauge determines the position of the tube on the drum 23. The cleats 24 and 25 also determine its position so that as the drum rotates clockwise, as seen in Figure 1, the tube is carried until it is engaged by the belts 41 and 42 which press the article to be operated on against the drum or cylinder 23.

A shelf 59 is supported on the uprights 3 and 4 and hold a supply of tubes to be sealed.

The operation of the machine is as follows:

The operator takes a single tube and places it on the drum 23 against one of the cleats 24, or, if the tube is long, against the cleats 24 and 25. As the drum rotates, the end of the tube comes up to the plate 58 and is shoved against it to determine the portion of the tube to be acted on by the flame. Further travel of the drum or cylinder 23 carries the tube into engagement with the steel bands 41 and 42 at the point where they pass around the pulleys 37 and 38. These bands tend to hold the tube firmly against the drum or cylinder and to expose the end of the tube to the action of the flame from the burner 53. Only a small portion of the end of the tube is exposed to the flame in the order of from $\frac{3}{16}$ to $\frac{1}{8}$ of an inch, depending upon the thickness of the material. As the end of the tube passes through the flame of the burner 53, it is immediately fused. The drum 23, together with the band 41, removes the heat so rapidly that no opportunity is given for the plastic material to become charred or decomposed. Furthermore, the band 41, together with the circumference of the drum 23, prevents the action of the heat from going any further than the exposed edge of the tube to be sealed. As the tube passes out of the zone of the flame of the burner 53, any loose end not confined by the bands 41, 42 has a tendency to leave the drum or cylinder. The arcuate shield 51, however, prevents the end of the tube from falling any further than the next cleat or ledge. After the tube is released by the steel bands 41, 42, it is guided into the hopper or container 52 by the end of the arcuate shield 51. It is to be noted that any heat from the burner 53 acting on the drum 23 and the steel band or belt 41 is rapidly dissipated. Any heat absorbed by the drum is dissipated because of the large volume of metal contained in the drum. Any heat that might affect the belt or steel band 41 is dissipated by the steel band passing through the air on its return travel to the feeding station.

Since it is obvious that various changes and modifications may be made in the above description without departing from the nature or spirit thereof, this invention is not restricted thereto, except as set forth in the appended claims.

I claim:

1. An apparatus for flame sealing thin walled thermoplastic tubing, which comprises a rotary drum conveyer having cleats in spaced relationship circumferentially thereof and against which the tubing is disposed, a guide to position the tubing transversely of said drum and expose the end of the tubing to be sealed a predetermined distance beyond the edge of said conveyer, means to clamp the positioned tubing onto said conveyer, a burner disposed adjacent said edge of said conveyer and in position to provide a flame in the path of travel of said exposed end whereby as said tubing is conveyed the exposed end will pass through the zone of action of said flame and the flame will act thereon to seal the same, an endless belt cooperating with said conveyer to restrict the action of said flame to said exposed end, and means to discharge the sealed tubing from the apparatus.

2. An apparatus for flame sealing thin walled thermoplastic tubing, which comprises a rotary drum conveyer having cleats in spaced relationship circumferentially thereof and against which the tubing is disposed, a guide to position the tubing transversely of said drum and expose the end of the tubing to be sealed a predetermined distance beyond the edge of said conveyer, a plurality of endless belts to clamp the positioned tubing onto said conveyer, a burner disposed adjacent said edge of said conveyer and in position to provide a flame in the path of travel of said exposed end whereby as said tubing is conveyed the exposed end will pass through the zone of action of said flame and the flame will act thereon to seal the same, one of said endless belts cooperating with said conveyer to restrict the action of said flame to said exposed end, and means to discharge the sealed tubing from the apparatus.

3. An apparatus for flame sealing thin walled thermoplastic tubing, which comprises a rotary drum conveyer having cleats in spaced relationship circumferentially thereof and against which the tubing is disposed, a guide to position the tubing transversely of said drum and expose the end of the tubing to be sealed a predetermined distance beyond the edge of said conveyer, a plurality of endless belts to clamp the positioned tubing onto said conveyer, an arcuate burner beneath said edge of said conveyer and in position to provide a flame in the path of travel of said exposed end whereby as said tubing is conveyed the exposed end will pass through the zone of action of said flame and the flame will act thereon to seal the same, one of said endless belts cooperating with said conveyer to restrict the action of said flame to said exposed end, and means to discharge the sealed tubing from the apparatus.

ROBERT McDOWALL.

REFERENCES CITED

The following references are of record in the file of this patent:

UNITED STATES PATENTS

| Number | Name | Date |
|--------|------|------|
| 706,419 | Jayne | Aug. 5, 1902 |
| 2,224,017 | Gurwick | Dec. 3, 1940 |
| 2,280,664 | Rutherford | Apr. 21, 1942 |
| 2,364,009 | Tessendorf et al. | Nov. 28, 1944 |
| 2,380,914 | Billeb | Aug. 7, 1945 |